United States Patent
Arkles et al.

(10) Patent No.: US 10,259,908 B2
(45) Date of Patent: Apr. 16, 2019

(54) SILYL-SUBSTITUTED POLYALKYLENE OXIDES AND METHODS OF PREPARATION

(71) Applicant: Gelest Technologies, Inc., Morrisville, PA (US)

(72) Inventors: Barry C. Arkles, Pipersville, PA (US); Gerald L. Larson, Newtown, PA (US); Jonathan D. Goff, Philadelphia, PA (US); Ferdinand Gonzaga, Philadelphia, PA (US)

(73) Assignee: Gelest Technologies, Inc., Morrisville, PA (US)

( * ) Notice: Subject to any disclaimer, the term of this patent is extended or adjusted under 35 U.S.C. 154(b) by 0 days.

(21) Appl. No.: 15/285,884

(22) Filed: Oct. 5, 2016

(65) Prior Publication Data
US 2017/0129998 A1    May 11, 2017

Related U.S. Application Data

(60) Provisional application No. 62/251,176, filed on Nov. 5, 2015.

(51) Int. Cl.
*C08G 65/336*    (2006.01)

(52) U.S. Cl.
CPC .................. *C08G 65/336* (2013.01)

(58) Field of Classification Search
CPC .................................................. C08G 65/22
See application file for complete search history.

(56) References Cited

PUBLICATIONS

Lee (Macromolecules, 45 (2012) 3722-3731) (Year: 2012).*
Huang (J. of Polymer Science: Part A: Polymer Chemistry, 43 (2005) 2038-2047).*

* cited by examiner

*Primary Examiner* — Kuo Liang Peng
(74) *Attorney, Agent, or Firm* — Panitch Schwarze Belisario & Nadel LLP

(57) ABSTRACT

A novel synthetic route to new classes of polymeric coupling agents using substituted epoxy monomers is reported. In the presence of an initiating agent and tris(pentafluorophenyl) borane catalyst, substituted epoxy monomers bearing polyalkylene oxide and trialkoxysilane moieties undergo a ring-opening polymerization. The polymerization is highly versatile and allows for the fine-tuning of functional, structural, and architectural features of the resulting polymeric coupling agents. These new polyalkylene oxides substituted with organosilyl groups are capable of bonding to and modifying inorganic surfaces. The products of this invention form thin hydrophilic films.

1 Claim, No Drawings

SILYL-SUBSTITUTED POLYALKYLENE OXIDES AND METHODS OF PREPARATION

CROSS-REFERENCE TO RELATED APPLICATION

This application claims priority to U.S. Provisional Application No. 62/251,176, filed Nov. 5, 2015, the disclosure of which is herein incorporated by reference in its entirety.

BACKGROUND OF THE INVENTION

The successful integration of materials into engineered devices often requires the precise tailoring of their surface physico-chemical properties. In the case of glasses and inorganic oxides, these properties can be precisely adjusted by the reactive deposition of a molecular or polymeric coupling agent. Coupling agents are generally organic-inorganic hybrid molecules with one or several reactive moieties (often chloro- or alkoxy-silanes, or cyclic azasilanes) and a non-reactive fragment that will introduce the desired property (such as a PEG chain for hydrophilicity, a perfluoroalkyl chain for hydrophobicity/oleophobicity, etc.).

BRIEF SUMMARY OF THE INVENTION

A homopolymer according to a first embodiment of the invention has formula (I):

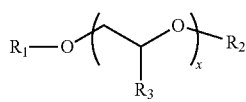

(I)

wherein $R_1$ is a branched or linear C1 to C18-saturated alkyl; a branched or linear C1 to C18-unsaturated alkyl; a propyl methacrylate; an ethyl methacrylate; a C6 to C14-aryl; $CH_2CH_2C_nF_{2n+1}$ where n=3 to 10; a polyalkylene oxide chain; a $R_6$-polydimethylsiloxane chain where $R_6$ is a linear or branched C1 to C10 alkyl chain; a $R_6$-polyphenylmethylsiloxane chain where $R_6$ is a linear or branched C1 to C10 alkyl chain; a $R_6$-polyalkylmethylsiloxane chain where $R_6$ is a linear or branched C1 to C10 alkyl chain; or a $R_6$-polytrifluoropropylmethylsiloxane chain where $R_6$ is a linear or branched C1 to C10 alkyl chain;

$R_2$ is selected from hydrogen; acryloyl; methacryloyl; C1 to C10 saturated alkyl; C1 to C10 unsaturated alkyl, acyl; phenacyl; and trimethylsilyl;

$R_3$ is selected from hydrogen; methyl; allyloxymethyl; bis(trimethylsiloxy)methylsilylpropoxymethyl; tris(trimethylsiloxy)silylpropoxymethyl; triethoxysilylpropoxymethyl; trimethoxysilylpropoxymethyl; [methoxy(PEG$_n$)propyl]tetramethyldisiloxanylpropoxymethyl where n=2 to 100; methyldiethoxysilylpropoxymethyl; dimethylethoxysilylpropoxymethyl; methyldimethoxysilylpropoxymethyl; dimethylmethoxysilylpropoxymethyl; t-butyldimethylsiloxymethyl; pentamethyldisiloxanylpropoxymethyl; tetramethyldisiloxanylpropoxymethyl; trialkylsilylpropoxymethyl; a methacryloxymethyl; a 4-chloromethylphenyl; a 3,3,4,4,5,5,6,6,6-nonafluorohexyl; a 3,3,4,4,5,5,6,6,7,7,8,8,8-tridecafluorooctyl; 3,3,4,4,5,5,6,6,7,7,8,8,9,9,10,10,10-heptadecafluorodecyl; and a polydimethylsiloxane chain; and x=1 to 100.

A block or random telechelic copolymer according to a second embodiment of the invention has formula (II):

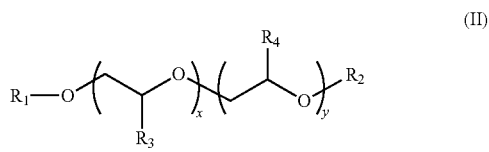

(II)

wherein $R_1$, $R_2$, $R_3$, x and y are as previously described, and $R_4$ is selected from hydrogen; methyl; allyloxymethyl; bis(trimethylsiloxy)methylsilylpropoxymethyl; tris(trimethylsiloxy)silylpropoxymethyl; triethoxysilylpropoxymethyl; trimethoxysilylpropoxymethyl; [methoxy(PEG$_n$)propyl]tetramethyldisiloxanylpropoxymethyl where n=2 to 100; methyldiethoxysilylpropoxymethyl; dimethylethoxysilylpropoxymethyl; methyldimethoxysilylpropoxymethyl; dimethylmethoxysilylpropoxymethyl; t-butyldimethylsiloxymethyl; pentamethyldisiloxanylpropoxymethyl; tetramethyldisiloxanylpropoxymethyl; trialkylsilylpropoxymethyl; a methacryloxyethyl; a 4-chloromethylphenyl; a 3,3,4,4,5,5,6,6,6-nonafluorohexyl; a 3,3,4,4,5,5,6,6,7,7,8,8,8-tridecafluorooctyl; 3,3,4,4,5,5,6,6,7,7,8,8,9,9,10,10,10-heptadecafluorodecyl; and a polydimethylsiloxane chain.

A block or random telechelic copolymer according to a third embodiment of the invention has formula (III):

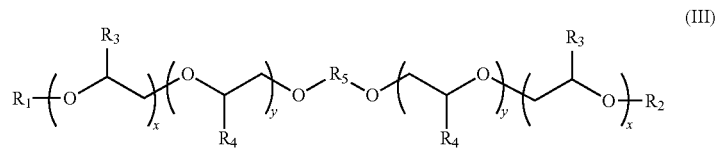

(III)

wherein $R_1$, $R_2$, $R_3$, $R_4$, x, and y are as previously described and $R_5$ is selected from a polyalkylene oxide; an alkyl chain; a polydimethylsiloxane chain; an aryl or poly aryl; diols; and diamines.

A block or random telechelic copolymer according to a fourth embodiment of the invention has formula (IV):

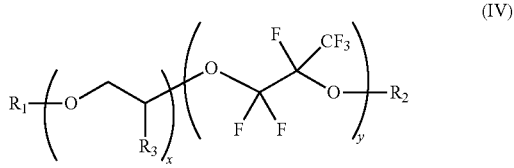

(IV)

wherein $R_1$, $R_2$, $R_3$, $R_4$, x, and y are as previously described.

A block or random telechelic copolymer according to a fifth embodiment of the invention has formula (V):

(V)

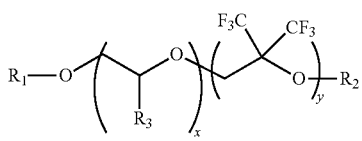

wherein $R_1$, $R_2$, $R_3$, $R_4$, x, and y are as previously described.

A block or random telechelic copolymer according to a sixth embodiment of the invention has formula (VI):

(VI)

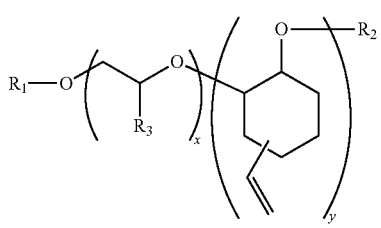

wherein $R_1$, $R_2$, $R_3$, $R_4$, x, and y are as previously described.

A block or random telechelic copolymer according to a seventh embodiment of the invention has formula (VII):

(VII)

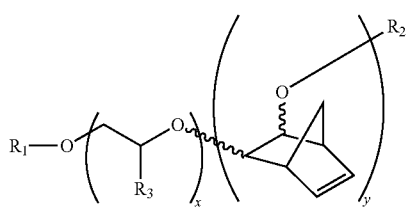

wherein $R_1$, $R_2$, $R_3$, $R_4$, x, and y are as previously described.

A block or random telechelic copolymer according to an eighth embodiment of the invention has formula (VIII):

(VIII)

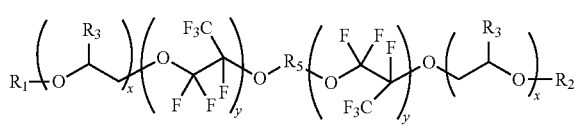

wherein $R_1$, $R_2$, $R_3$, $R_4$, x, and y are as previously described.

A block or random telechelic copolymer according to a ninth embodiment of the invention has formula (IX):

(IX)

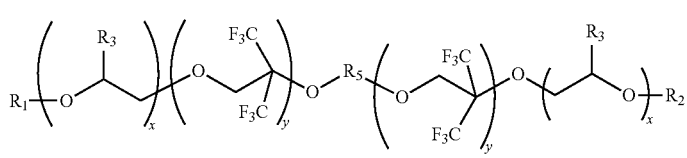

wherein $R_1$, $R_2$, $R_3$, $R_5$, x, and y are as previously described.

A block or random telechelic copolymer according to a tenth embodiment of the invention has formula (X):

(X)

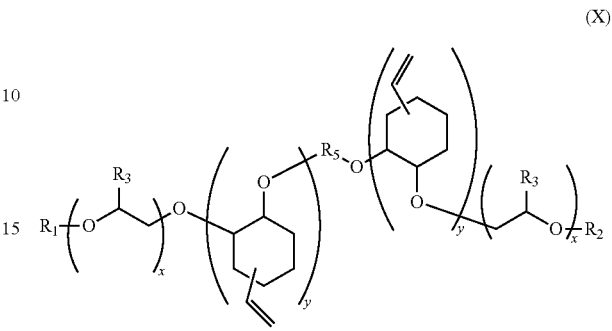

wherein $R_1$, $R_2$, $R_3$, $R_5$, x, and y are as previously described.

A block or random telechelic copolymer according to an eleventh embodiment of the invention has formula (XI):

(XI)

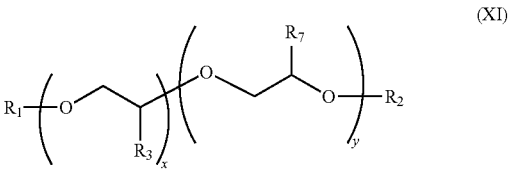

wherein $R_1$, $R_2$, $R_3$, x, and y are as previously described and $R_7$ may be $C_4F_9$, $C_6F_{13}$, or $C_8F_{17}$.

DETAILED DESCRIPTION OF THE INVENTION

A novel synthetic route to new classes of polymeric coupling agents using substituted epoxy monomers is reported. In the presence of an initiating agent and tris (pentafluorophenyl)borane catalyst, substituted epoxy monomers bearing polyalkylene oxide and trialkoxysilane moieties undergo a ring-opening polymerization to yield homopolymers and block or random telechelic copolymers. The polymerization is highly versatile and allows for the fine-tuning of functional, structural and architectural features of the resulting polymeric coupling agents. These new polyalkylene oxides substituted with organosilyl groups are capable of bonding to and modifying inorganic surfaces. The silyl-substituted polyalkylene oxide products of this invention form thin hydrophilic films.

A homopolymer according to an embodiment of the invention has formula (I):

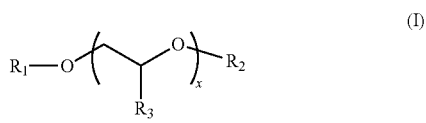

In formula (I), x=1 to 100 and $R_1$ is a branched or linear C1 to C18-saturated alkyl; a branched or linear C1 to C18-unsaturated alkyl; a propyl methacrylate; an ethyl methacrylate; a C6 to C14-aryl; $CH_2CH_2C_nF_{2n+1}$ where n=3 to 10; a polyalkylene oxide chain; a $R_6$-polydimethylsiloxane chain where $R_6$ is a linear or branched C1 to C10 alkyl chain; a $R_6$-polyphenylmethylsiloxane chain where $R_6$ is a linear or branched C1 to C10 alkyl chain; a $R_6$-polyalkylmethylsiloxane chain where $R_6$ is a linear or branched C1 to C10 alkyl chain; or a $R_6$-polytrifluoropropylmethylsiloxane chain where $R_6$ is a linear or branched C1 to C10 alkyl chain.

$R_2$ is selected from hydrogen; acryloyl; methacryloyl; C1 to C10 saturated alkyl; C1 to C10 unsaturated alkyl, acyl; phenacyl; and trimethylsilyl.

$R_3$ is selected from hydrogen; methyl; allyloxymethyl; bis(trimethylsiloxy)methylsilylpropoxymethyl; tris(trimethylsiloxy)silylpropoxymethyl; triethoxysilylpropoxymethyl; trimethoxysilylpropoxymethyl; [methoxy(PEG$_n$)propyl]tetramethyldisiloxanylpropoxymethyl where n=2 to 100; methyldiethoxysilylpropoxymethyl; dimethylethoxysilylpropoxymethyl; methyldimethoxysilylpropoxymethyl; dimethylmethoxysilylpropoxymethyl; t-butyldimethylsiloxymethyl; pentamethyldisiloxanylpropoxymethyl; tetramethyldisiloxanylpropoxymethyl; trialkylsilylpropoxymethyl; a methacryloxymethyl; a 4-chloromethylphenyl; a 3,3,4,4,5,5,6,6,6-nonafluorohexyl; a 3,3,4,4,5,5,6,6,7,7,8,8,8-tridecafluorooctyl; a 3,3,4,4,5,5,6,6,7,7,8,8,9,9,10,10,10-heptadecafluorodecyl; and a polydimethylsiloxane chain.

A block or random telechelic copolymer (monofunctional initiator) according to an embodiment of the invention has formula (II):

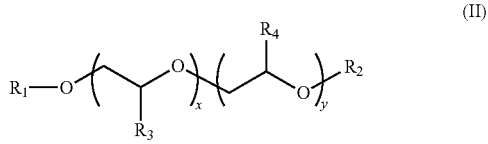

In formula (II), $R_1$, $R_2$, $R_3$, x, and y are as previously described and $R_4$ is selected from hydrogen; methyl; allyloxymethyl; bis(trimethylsiloxy)methylsilylpropoxymethyl; tris(trimethylsiloxy)silylpropoxymethyl; triethoxysilylpropoxymethyl; trimethoxysilylpropoxymethyl; [methoxy(PEG$_n$)propyl]tetramethyldisiloxanylpropoxymethyl where n=2 to 100; methyldiethoxysilylpropoxymethyl; dimethylethoxysilylpropoxymethyl; methyldimethoxysilylpropoxymethyl; dimethylmethoxysilylpropoxymethyl; t-butyldimethylsiloxymethyl; pentamethyldisiloxanylpropoxymethyl; tetramethyldisiloxanylpropoxymethyl; trialkylsilylpropoxymethyl; a methacryloxymethyl; a 4-chloromethylphenyl; a 3,3,4,4,5,5,6,6,6-nonafluorohexyl; a 3,3,4,4,5,5,6,6,7,7,8,8,8-tridecafluorooctyl; 3,3,4,4,5,5,6,6,7,7,8,8,9,9,10,10,10-heptadecafluorodecyl; or a polydimethylsiloxane chain.

For example, when $R_4$ is methacryloxymethyl, the copolymer having formula (II) has the following structure:

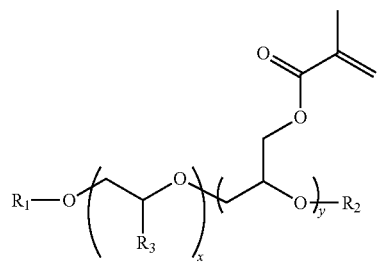

Alternatively, when $R_4$ is 4-(chloromethyl)phenyl, the copolymer having formula (II) has the following structure:

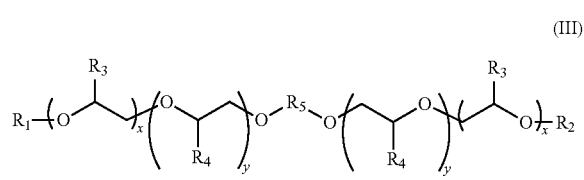

A block or random telechelic copolymer (polyfunctional initiator) according to an embodiment of the invention has formula (III):

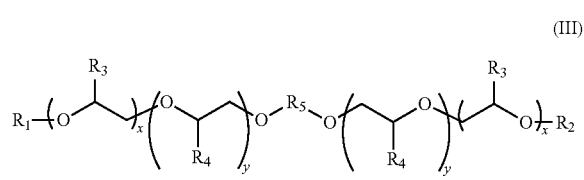

In formula (III), $R_1$, $R_2$, $R_3$, $R_4$, x, and y are as previously described and $R_5$ is selected from a polyalkylene oxide; an alkyl chain; a polydimethylsiloxane chain; an aryl or poly aryl; diols; and diamines.

A block or random telechelic copolymer according to an embodiment of the invention has formula (IV):

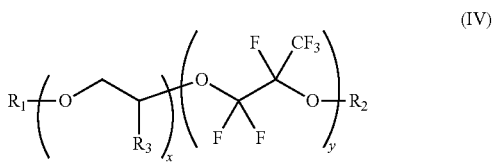

In formula (IV), $R_1$, $R_2$, $R_3$, x, and y are as previously described.

A block or random telechelic copolymer according to a further embodiment of the invention has formula (V):

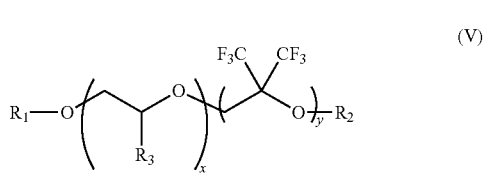

In formula (V), $R_1$, $R_2$, $R_3$, x, and y are as previously described.

A block or random telechelic copolymer according to another embodiment of the invention has formula (VI):

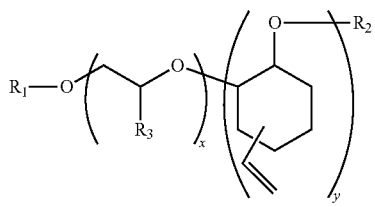
(VI)

In formula (VI), $R_1$, $R_2$, $R_3$, x, and y are as previously described.

A block or random telechelic copolymer according to a different embodiment of the invention has formula (VII):

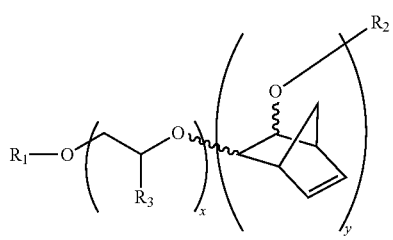
(VII)

In formula (VII), $R_1$, $R_2$, $R_3$, x, and y are as previously described.

A block or random telechelic copolymer according to another embodiment of the invention has formula (VIII):

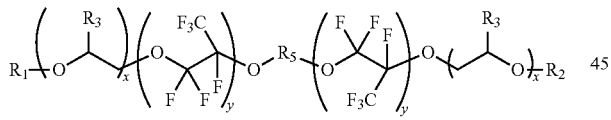
(VIII)

In formula (VIII), $R_1$, $R_2$, $R_3$, $R_5$, x, and y are as previously described.

A block or random telechelic copolymer according to another embodiment of the invention has formula (IX):

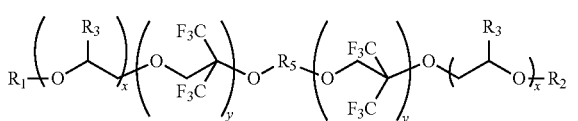
(IX)

In formula (IX), $R_1$, $R_2$, $R_3$, $R_5$, x, and y are as previously described.

A block or random telechelic copolymer according to another embodiment of the invention has formula (X):

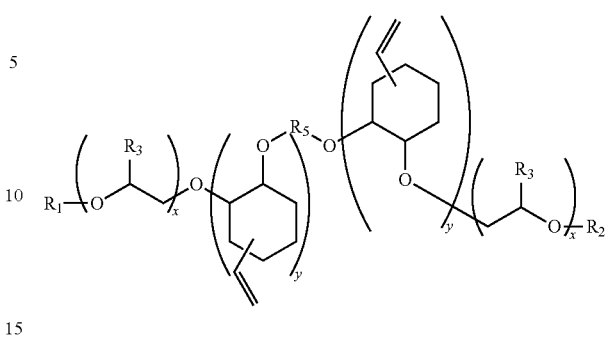
(X)

In formula (X), $R_1$, $R_2$, $R_3$, $R_5$, x, and y are as previously described.

Finally, a further block or random telechelic copolymer according to an embodiment of the invention has formula (XI):

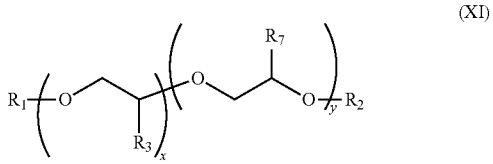
(XI)

In formula (X), $R_1$, $R_2$, $R_3$, x, and y are as previously described, and $R_7$ may be $C_4F_9$, $C6F_{13}$, or $C_8F_{17}$.

This invention will now be described in connection with the following, non-limiting examples.

EXAMPLE 1

(Comparative Example): Synthesis of Methallyloxy Polyethylene Oxide (DP=25)

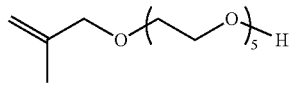

A 1 L 4 neck flask equipped with an overhead stirrer, pot thermometer, dry ice/acetone reflux condenser was blanketed with nitrogen and charged with 98 g (1360 mmol) of methallyl alcohol and tris(pentafluorophenyl)borane catalyst (7.5 g of 9.3 wt % solution in toluene; 1.4 mmol). The reactor was cooled with a water/dry ice bath. Ethylene oxide (300 g; 6.8 mol) was slowly dispensed to the reaction mixture from a small cylinder cooled with a dry ice/acetone mixture over 5 hours. The pot temperature increased steadily from 20° C. to a maximum pot temperature of 100° C. during the monomer addition. The mixture was allowed to cool to room temperature and was stirred for an additional 17 hours.

The reaction mixture was sparged with nitrogen for 1 hour and was dissolved in methylene chloride (343 g). The organic layer was washed with 1.0 M aqueous HCl (2×200 mL) and deionized water (1×200 mL). The organic layer was recovered, dried with sodium sulfate and stripped under 1.0 mm Hg vacuum to a maximum pot temperature of 105° C., yielding a clear, light yellow oil (340 g). GPC data (polystyrene standard without correlation): Mn: 380; Mw/Mn: 1.3. $^1$H NMR confirmed the expected structure (molecular weight~315 g/mol) with no residual epoxy monomer detected.

EXAMPLE 2

(Comparative Example): Synthesis of Methallyloxy Polypropylene Oxide (DP=25)

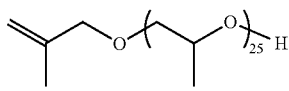

A 1 L 4 neck flask equipped with an overhead stirrer, pot thermometer, reflux condenser and addition funnel was blanketed with nitrogen and charged with 28 g (390 mmol) of methallyl alcohol and tris(pentafluorophenyl)borane catalyst (17 g of 9.3 wt % solution in toluene; 3.1 mmol). The reactor was cooled with a water/dry ice bath. Propylene oxide (600 g; 10 mol) was slowly added to the stirring reaction mixture via an addition funnel over 4 hours. The pot temperature increased steadily from 5° C. to 83° C. during the monomer addition. The mixture was allowed to cool to room temperature and was stirred for an additional 18 hours.

The reaction mixture was dissolved in methylene chloride (790 g) and washed with 0.1 M aqueous HCl (2×500 mL). The organic layer was recovered, dried with sodium sulfate and stripped under 1.0 mm Hg vacuum to a maximum pot temperature of 105° C. The resulting clear, light yellow oil (410 g) had a density of 0.996 g/ml and a viscosity of 139 cSt. $^1$H NMR confirmed the expected structure (molecular weight~1500 g/mol) with no residual epoxy monomer detected.

EXAMPLE 3

Synthesis of Bis(trimethylsiloxy)methylsilylpropoxy Substituted Polypropylene Oxide (Methallyl Alcohol Initiator; DP=10)

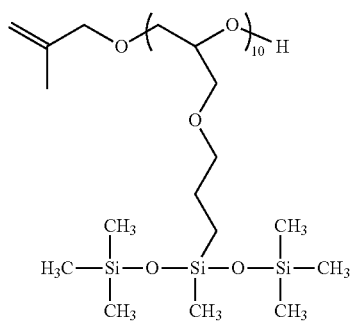

A 1 L 4 neck flask equipped with an overhead stirrer, pot thermometer, reflux condenser and addition funnel was blanketed with nitrogen and charged with 5.0 g (69 mmol) of methallyl alcohol and tris(pentafluorophenyl)borane catalyst (3.2 g of 9.3 wt % solution in toluene; 0.58 mmol). (3-Glycidoxypropyl)bis(trimethylsiloxy)methylsilane (233 g; 693 mmol) was slowly added to the stirring reaction mixture via an addition funnel over 3 hours. A mild exotherm was observed during the first 90 minutes of silane addition (~190 mL). At this point, the pot temperature increased rapidly from 31° C. to 62° C. over 5 minutes and the reactor was cooled with a water/dry ice bath. After silane addition was complete, the reaction mixture was stirred for 20 minutes at room temperature. An addition charge of tris(pentafluorophenyl)borane catalyst (1.0 g of 9.3 wt % solution in toluene; 0.18 mmol) was added to the reaction mixture. A slight exotherm was observed, pot temperature rose from 21° C. to 26° C., and the mixture was stirred for 19 hours.

The reaction mixture was treated with 25 g of basic alumina and the slurry was stirred for 1 hour. The slurry was filtered and the recovered filtrate was stripped under 1.5 mm Hg vacuum to a maximum pot temperature of 105° C. A viscous clear, colorless oil (229 g) was collected. GPC data (polystyrene standard without correlation): Mn: 1,740; Mw/Mn: 1.49. $^1$H NMR confirmed the expected structure with no residual epoxy monomer detected.

EXAMPLE 4

Synthesis of Bis(trimethylsiloxy)methylsilylpropoxy Substituted Polypropylene Oxide (Methallyl Alcohol Initiator; DP=20)

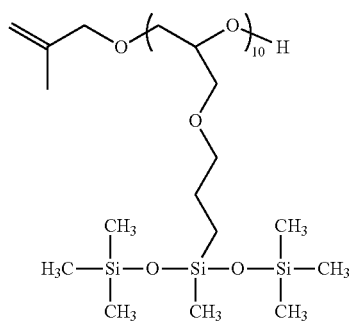

A 1 L 4 neck flask equipped with an overhead stirrer, pot thermometer, reflux condenser and addition funnel was blanketed with nitrogen and charged with 2.5 g (35 mmol) of methallyl alcohol and tris(pentafluorophenyl)borane catalyst (1.6 g of 9.3 wt % solution in toluene; 0.29 mmol). (3-Glycidoxypropyl)bis(trimethylsiloxy)methylsilane (233 g; 693 mmol) was slowly added to the stirring reaction mixture via an addition funnel over 90 minutes. After 1 hour of stirring, an additional charge of tris(pentafluorophenyl) borane catalyst (1.6 g of 9.3 wt % solution in toluene; 0.29 mmol) was added to the reaction mixture. The pot temperature increased rapidly from 18° C. to 94° C. over 30 minutes. The mixture was stirred for 3 hours.

The reaction mixture was treated with 23 g of basic alumina and the slurry was stirred for 1 hour. The slurry was filtered and the recovered filtrate was stripped under 1.5 mm Hg vacuum to a maximum pot temperature of 120° C. A viscous clear, colorless oil (220 g) was collected. GPC data (polystyrene standard without correlation): Mn: 1,440; Mw/Mn: 1.66. $^1$H NMR confirmed the expected structure with no residual epoxy monomer detected.

EXAMPLE 5

Synthesis of Bis(trimethylsiloxy)methylsilyl-propoxy-co-Triethoxysilylpropoxy Substituted Polypropylene Oxide (Methallyl Alcohol Initiator; DP=20)

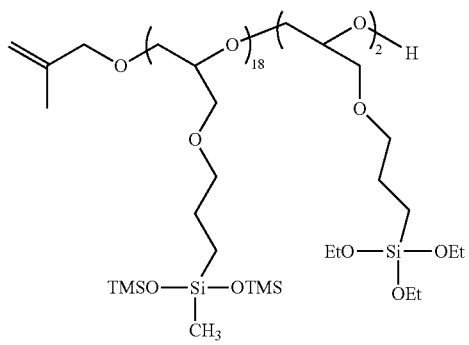

A 1 L 4 neck flask equipped with an overhead stirrer, pot thermometer, reflux condenser and addition funnel was blanketed with nitrogen and charged with 2.5 g (35 mmol) of methallyl alcohol and tris(pentafluorophenyl)borane catalyst (3.2 g of 9.3 wt % solution in toluene; 0.58 mmol). A mixture of (3-glycidoxypropyl)bis(trimethylsiloxy)methylsilane (210 g; 624 mmol) and (3-glycidoxypropyl)triethoxysilane (19 g; 69 mmol) was charged to the addition funnel and slowly added to the stirring reaction mixture over 3 hours. The pot temperature increased from 20° C. to 50° C. The mixture was stirred for an additional 3.5 hours.

The reaction mixture was treated with 24 g of basic alumina and the slurry was stirred for 1 hour. The slurry was filtered and the recovered filtrate was stripped under 1.0 mm Hg vacuum to a maximum pot temperature of 120° C. A viscous clear, colorless oil (199 g) was collected. GPC data (polystyrene standard without correlation): Mn: 2330; Mw/Mn: 1.88. $^1$H NMR confirmed the expected structure with no residual epoxy monomer detected.

EXAMPLE 6

Synthesis of Bis(trimethylsiloxy)methylsilyl-propoxy-co-Triethoxysilylpropoxy Substituted Polypropylene Oxide (PEG Initiator; DP=6)

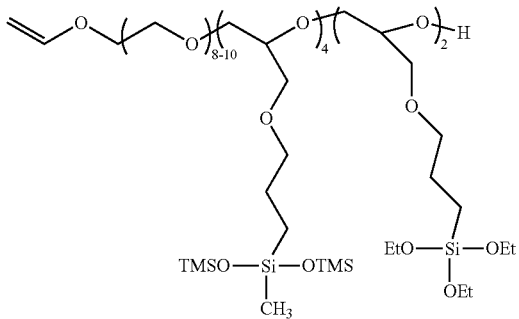

A 1 L 4 neck flask equipped with an overhead stirrer, pot thermometer, reflux condenser and addition funnel was blanketed with nitrogen and charged with 50 g (100 mmol) of allyloxy(polyethylene oxide) [DP=6-8] and tris(pentafluorophenyl)borane catalyst (2.6 g of 9.3 wt % solution in toluene; 0.47 mmol). The mixture was heated to 115° C. at 0.1 mm Hg for 1.5 hours. The reactor was cooled to 40° C. under nitrogen blanket. A mixture of (3-glycidoxypropyl)bis(trimethylsiloxy)methylsilane (135 g; 400 mmol) and (3-glycidoxypropyl)triethoxysilane (56 g; 200 mmol) was charged to the addition funnel and slowly added to the stirring reaction mixture over 2 hours. Two additional charges of tris(pentafluorophenyl)borane catalyst (2×2.6 g of 9.3 wt % solution in toluene; 2×0.47 mmol) were added to the reaction mixture (1$^{st}$ charge was at 1 hour into monomer addition, 2$^{nd}$ charge was at end of monomer addition). The pot temperature increased rapidly from 24° C. to 89° C. over 20 minutes. The mixture was stirred for an additional 18 hours.

The reaction mixture was treated with 24 g of basic alumina and the slurry was stirred for 1 hour. The slurry was filtered and the recovered filtrate was stripped under 0.5 mm Hg vacuum to a maximum pot temperature of 128° C. A viscous clear, light yellow oil (207 g) was collected. GPC data (polystyrene standard without correlation): Mn: 1,390; Mw/Mn: 1.77. $^1$H NMR confirmed the expected structure with no residual epoxy monomer detected.

EXAMPLE 7

Synthesis of [Methoxy(PEG$_{6-9}$)propyl]tetramethyldisiloxanylpropoxy-co-Triethoxysilylpropoxy Substituted Polypropylene Oxide (Methallyl Alcohol Initiator; DP=20)

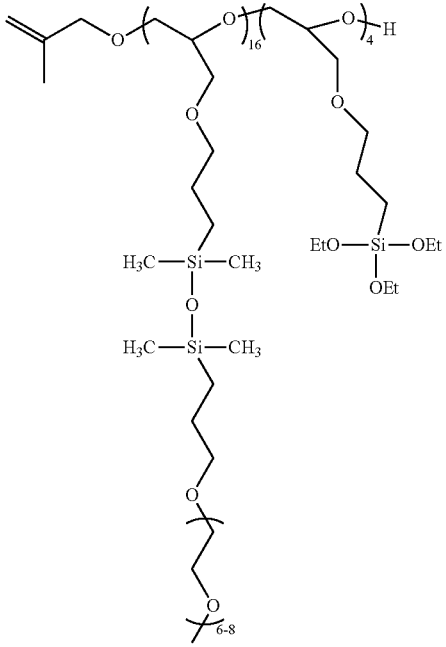

A 1 L 4 neck flask equipped with an overhead stirrer, pot thermometer, reflux condenser and addition funnel was blanketed with nitrogen and charged with 1.4 g (20 mmol) of methallyl alcohol. 40 mL of a 1-glycidoxypropyl-3-[methoxy(polyethyleneoxy)$_{6-9}$propyl]tetramethyldisiloxane (201 g; 320 mmol) and (3-glycidoxypropyl)triethoxysilane (22 g; 80 mmol) mixture was charged to the reactor. The remaining volume of the monomer mixture was charged to the addition funnel. The reaction mixture was heated to 70° C. and tris(pentafluorophenyl)borane catalyst (0.93 g of 9.3 wt % solution in toluene; 0.17 mmol) was injected at once into the pot. An immediate exotherm of 25° C. was observed and the remaining monomer mixture was added over 1 hour. The mixture was stirred for an additional 22 hours.

The reaction mixture was treated with 23 g of basic alumina and the slurry was stirred for 1 hour. The slurry was filtered and the recovered filtrate was stripped under 0.1 mm Hg vacuum to a maximum pot temperature of 100° C. A viscous clear, colorless oil (188 g) was collected. GPC data (polystyrene standard without correlation): Mn: 1,230; Mw/Mn: 2.13. $^1$H NMR confirmed the expected structure with no residual epoxy monomer detected.

EXAMPLE 8

Synthesis of [Methoxy(PEG$_{6-9}$)propyl]tetramethyldisiloxanylpropoxy-co-Triethoxysilylpropoxy Substituted Polypropylene Oxide (Methallyl Alcohol Initiator)

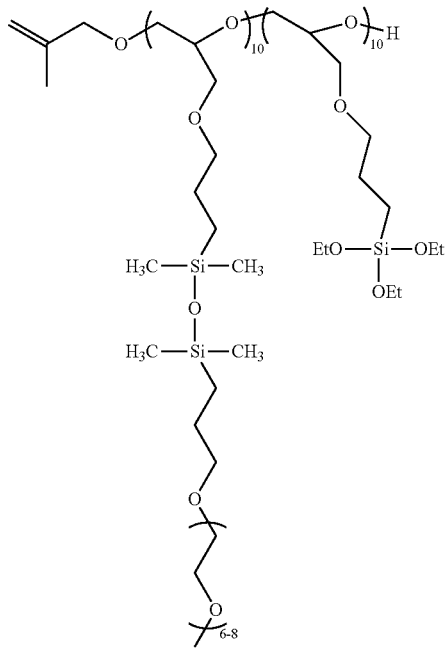

A 250 mL 3 neck flask equipped with a magnetic stir bar, pot thermometer, and reflux condenser was blanketed with nitrogen and charged with 0.07 g (1 mmol) of methallyl alcohol and a mixture of a 1-glycidoxypropyl-3-[methoxy (polyethyleneoxy)$_{6-9}$propyl]tetramethyldisiloxane (63 g; 100 mmol) and (3-glycidoxypropyl)triethoxysilane (28 g; 100 mmol). The reaction mixture was heated to 70° C. and stirred for 1 hour. Tris(pentafluorophenyl)borane catalyst (0.5 g of 9.3 wt % solution in toluene; 0.1 mmol) was injected at once into the pot. A strong exotherm was observed and the pot temperature increased rapidly to 147° C. The mixture was allowed to cool to room temperature and stirred for an additional 18 hours.

The reaction mixture was treated with 7 g of basic alumina and the slurry was stirred for 1 hour. The slurry was filtered and the filtrate was recovered. A viscous clear, yellow oil (71 g) was collected. $^1$H NMR confirmed the expected structure with no residual epoxy monomer detected.

EXAMPLE 9

Synthesis of Bis(trimethylsiloxy)methylsilylpropoxy-co-Triethoxysilylpropoxy Substituted Polypropylene Oxide (PEG Diol Initiator)

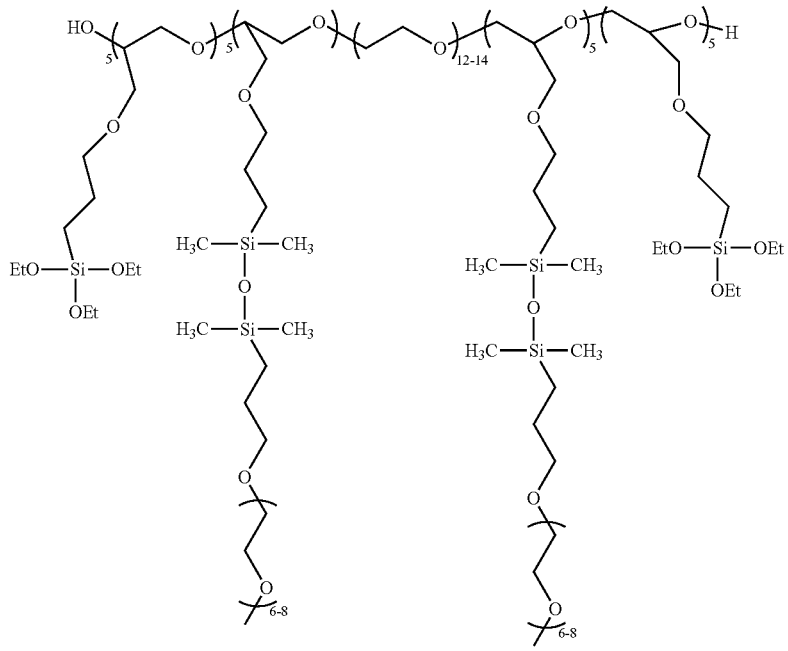

A 250 mL 3 neck flask equipped with a magnetic stir bar, pot thermometer, and reflux condenser was blanketed with nitrogen and charged with 0.3 g (0.5 mmol) of polyethylene oxide diol [DP=12-14] and a mixture of 1-glycidoxypropyl-3-[methoxy(polyethyleneoxy)$_{6-9}$propyl]tetramethyldisiloxane (63 g; 100 mmol) and (3-glycidoxypropyl)triethoxysilane (28 g; 100 mmol). The reaction mixture was heated to 90° C. at 0.1 mm Hg for 1 hour. The reactor was cooled to 65° C. and placed under a nitrogen blanket. Tris(pentafluorophenyl)borane catalyst (0.5 g of 9.3 wt % solution in toluene; 0.1 mmol) was injected at once into the pot. A strong exotherm was observed and the pot temperature increased rapidly to 145° C. The mixture was allowed to cool to room temperature and stirred for an additional 1 hours.

The reaction mixture was treated with 8 g of basic alumina and the slurry was stirred for 1 hour. The slurry was filtered and the filtrate was recovered. A viscous clear, light yellow oil (73 g) was collected. $^1$H NMR confirmed the expected structure with no residual epoxy monomer detected.

EXAMPLE 10

Synthesis of [Methoxy(PEG$_{6-9}$)propyl]tetramethyldisiloxanylpropoxy Substituted Polypropylene Oxide (Hydroxyethyl Methacrylate Initiator)

A 250 mL 3 neck flask equipped with a magnetic stir bar, pot thermometer, and reflux condenser was blanketed with nitrogen and charged with 20 mL of toluene. 0.65 g (5 mmol) of hydroxyethylmethacrylate was added to the pot, followed by 2 g of 1-glycidoxypropyl-3-[methoxy(polyethyleneoxy)$_{69}$propyl]tetramethyldisiloxane (3.2 mmol. Tris (pentafluorophenyl)borane catalyst (1.9 g of 9.3 wt % solution in toluene; 0.4 mmol) was injected at once into the pot. 1-glycidoxypropyl-3-[methoxy(polyethyleneoxy)$_{6-9}$propyl] tetramethyldisiloxane (45 g; 72 mmol) was added slowly via addition funnel over 20 minutes. The pot temperature increased to 115° C. The reaction mixture was allowed to cool to room temperature and was stirred for an addition hour.

The reaction mixture was treated with 5 g of basic alumina. The slurry was filtered. A viscous clear, yellow oil (45 g) was collected. $^1$H NMR showed complete conversion of monomer.

EXAMPLE 11

Hydrophilic Modification of Glass Slide with [Methoxy(PEG$_{6-9}$)propyl]tetramethyldisiloxanylpropoxy-co-Substituted Polypropylene Oxide (Methallyl Alcohol Initiator; DP=20) Surface Treatment An acid-etched borosilicate glass slide was immersed in a 70 g solution comprised of 90 wt % ethanol, 5 wt % deionized water, 5 wt % [methoxy(PEG$_{6-9}$)propyl]tetramethyldisiloxanylpropoxy-co-triethoxysilylpropoxy substituted polypropylene oxide (Example 7), and 0.05 wt % acetic acid for 1 hour at ambient temperature. The treated glass slide was removed from solution and dipped once in an ethanol solution. The slide was dried under nitrogen flow and placed in an oven set at 110° C. for 1 hour. The slide was cooled to room temperature and contact angle measurements of deionized water on the Example 7 treated borosilicate glass surface were recorded. An initial hydrophilic contact angle of 17° was observed. After 1 minute, the deionized water contact angle further decreased to 7°, indicating a hydrophilic surface treatment of the borosilicate glass slide.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A block or random telechelic copolymer having formula (II):

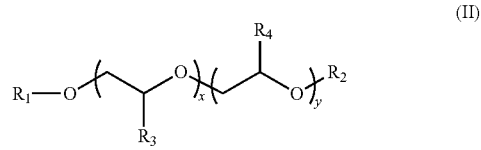

wherein $R_1$ is a branched or linear C1 to C18-saturated alkyl; a branched or linear C1 to C18-unsaturated alkyl; a methacryloxypropyl; a methacryloxyethyl; a C6 to C14-aryl; $CH_2CH_2C_nF_{2n+1}$ where n=3 to 10; a polyalkylene oxide chain; a $R_6$-polydimethylsiloxane chain where $R_6$ is a linear or branched C1 to C10 alkyl chain; a $R_6$-polyphenylmethylsiloxane chain where $R_6$ is a linear or branched C1 to C10 alkyl chain ; a $R_6$-polyalkylmethylsiloxane chain where $R_6$ is a linear or branched C1 to C10 alkyl chain; or a $R_6$-polytrifluoropropylmethylsiloxane chain where $R_6$ is a linear or branched C1 to C10 alkyl chain;

$R_2$ is selected from hydrogen; acryloyl; methacryloyl; C1 to C10 saturated alkyl; C1 to C10 unsaturated alkyl, acyl; phenacyl; and trimethylsilyl;

$R_3$ is selected from bis(trimethylsiloxy)methylsilylpropoxymethyl; tris(trimethylsiloxy)silylpropoxymethyl; triethoxysilylpropoxymethyl; trimethoxysilylpropoxymethyl; [methoxy(PEG$_n$)Opropyl]tetramethyldisiloxanylpropoxymethyl where n=2 to 100; methyldiethoxysilylpropoxymethyl; dimethylethoxysilylpropoxymethyl; methyldimethoxysilylpropoxymethyl; dimethylmethoxysilylpropoxymethyl; t-butyldimethylsiloxymethyl; pentamethyldisiloxanylpropoxymethyl; tetramethyldisiloxanylpropoxymethyl; trialkylsilylpropoxymethyl; and a polydimethylsiloxane chain;

$R_4$ is selected from bis(trimethylsiloxy)methylsilylpropoxymethyl; tris(trimethylsiloxy)silylpropoxymethyl; triethoxysilylpropoxymethyl; trimethoxysilylpropoxymethyl; [methoxy(PEG$_n$)propyl]tetramethyldisiloxanylpropoxymethyl where n=2 to 100; methyldiethoxysilylpropoxymethyl; dimethylethoxysilylpropoxymethyl; methyldimethoxysilylpropoxymethyl; dimethylmethoxysilylpropoxymethyl; t-butyldimethylsiloxymethyl; pentamethyldisiloxanylpropoxymethyl; tetramethyldisiloxanylpropoxymethyl; trialkylsilylpropoxymethyl; and a polydimethylsiloxane chain;

x=1 to 100 and y=1 to 100.

* * * * *